(12) United States Patent
Kneckt et al.

(10) Patent No.: US 8,274,894 B2
(45) Date of Patent: Sep. 25, 2012

(54) QUALITY OF SERVICE AND POWER AWARE FORWARDING RULES FOR MESH POINTS IN WIRELESS MESH NETWORKS

(75) Inventors: Jarkko Kneckt, Espoo (FI); Mika Kasslin, Espoo (FI); Janne Marin, Espoo (FI)

(73) Assignee: Nokia Corporation, Espoo (FI)

( * ) Notice: Subject to any disclaimer, the term of this patent is extended or adjusted under 35 U.S.C. 154(b) by 501 days.

(21) Appl. No.: 12/151,627

(22) Filed: May 7, 2008

(65) Prior Publication Data

US 2009/0279449 A1    Nov. 12, 2009

(51) Int. Cl.
*H04J 1/16* (2006.01)

(52) U.S. Cl. ........ 370/235; 370/230; 370/231; 370/406; 370/408

(58) Field of Classification Search .................. 370/253, 370/230, 231, 235, 408, 406
See application file for complete search history.

(56) References Cited

U.S. PATENT DOCUMENTS

| | | | | |
|---|---|---|---|---|
| 6,917,598 B1 * | 7/2005 | Emeott et al. | | 370/311 |
| 6,973,052 B2 * | 12/2005 | Wang et al. | | 370/278 |
| 7,286,551 B2 * | 10/2007 | Park et al. | | 370/412 |
| 7,564,826 B2 * | 7/2009 | Sherman et al. | | 370/338 |
| 7,590,100 B2 * | 9/2009 | Smith et al. | | 370/346 |
| 7,746,879 B2 * | 6/2010 | Kangude et al. | | 370/406 |
| 2006/0034219 A1 * | 2/2006 | Gu et al. | | 370/329 |
| 2006/0056382 A1 * | 3/2006 | Yamada et al. | | 370/349 |
| 2006/0193285 A1 * | 8/2006 | Roy et al. | | 370/328 |
| 2006/0253736 A1 * | 11/2006 | Rudolf et al. | | 714/12 |
| 2006/0268716 A1 * | 11/2006 | Wijting et al. | | 370/235 |
| 2006/0268749 A1 * | 11/2006 | Rahman et al. | | 370/256 |
| 2006/0271703 A1 * | 11/2006 | Kim et al. | | 370/346 |
| 2007/0053309 A1 * | 3/2007 | Kangude et al. | | 455/445 |
| 2007/0060141 A1 * | 3/2007 | Kangude et al. | | 455/445 |
| 2007/0086471 A1 | 4/2007 | Igarashi et al. | | 370/412 |
| 2007/0124443 A1 * | 5/2007 | Nanda et al. | | 709/223 |
| 2007/0242634 A1 * | 10/2007 | Calcev et al. | | 370/318 |
| 2007/0263647 A1 | 11/2007 | Shorty et al. | | 370/406 |
| 2008/0037570 A1 * | 2/2008 | Kim et al. | | 370/406 |
| 2008/0205385 A1 * | 8/2008 | Zeng et al. | | 370/389 |
| 2009/0067373 A1 | 3/2009 | Kneckt et al. | | 370/328 |

FOREIGN PATENT DOCUMENTS

| | | | |
|---|---|---|---|
| WO | WO 2006/099134 | * | 9/2006 |
| WO | WO 2007/047756 | * | 4/2007 |

OTHER PUBLICATIONS

"Power save for 802.11s", Jarkko Kneckt, et al., IEEE 802.11-08/0168r1, Jan. 2008, pp. 1-9.
"Principles of IEEE 802.11s", Guido R. Hiertz, et al., IEEE 2007, pp. 1002-1007.

(Continued)

*Primary Examiner* — Ricky Ngo
*Assistant Examiner* — Dewanda Samuel
(74) *Attorney, Agent, or Firm* — Harrington & Smith

(57) ABSTRACT

Apparatus, methods and computer program products provide quality of service and power aware forwarding rules for mesh points in wireless mesh networks by monitoring frame flow to and from a first mesh point in the wireless mesh network; and in dependence on the monitored frame flow, setting a power management mode of the first mesh point. The first mesh point monitors, for example, the power save mode and mesh deterministic access status of peer modes and selects power save and frame transmission modes in dependence on the monitored information.

46 Claims, 10 Drawing Sheets

FORWARDING MESH POINTS USE ACTIVE MODE, POWER SAVE MODE OR MESH DETERMINISTIC ACCESS TO FORWARD DATA

OTHER PUBLICATIONS

"Evaluation of EDCF Mechanism for QoS in IEEE802.11 Wireless Networks", Daqing Gu et al., TR-2003-51, May 2003, 7 pgs.

IEEE Standard 802.11e Part 11: Wireless LAN Medium Access Control (MAC) and Physical Layer (PHY) specifications; Amendment 8: Medium Access Control (MAC) Quality of Service Enhancements, IEEE 2005, 189 pgs.

Wang X. et al. 'IEEE 802.11s wireless mesh networks; framework and challenges', Ad Hoc Networks, available online Oct. 22, 2007, 2007 Elsevier B.V., vol. 6, 2008, pp. 970-984, section 3.3.3. and 3.3.5.

"Information technology—Telecommunications and information exchange between systems—Local and metropolitan area networks—Specific requirements", Part 11: Wireless LAN Medium Access Control (MAC) and Physical Layer (PHY) Specifications, LAN MAN Standards Committee of the IEEE Computer Society, ANSI/IEEE Std. 801.11, 1999 Edition (R2003), pp. 128,129, 133-136,304,307.

* cited by examiner

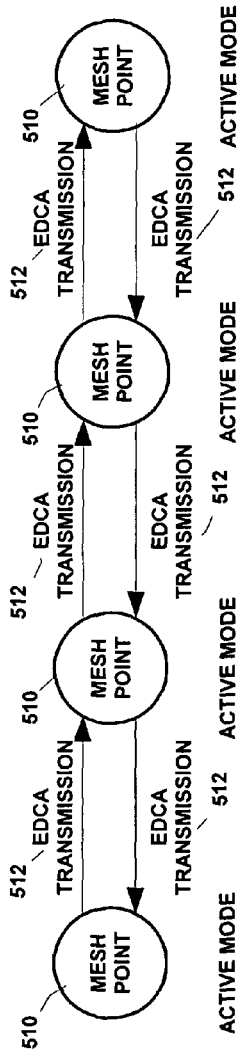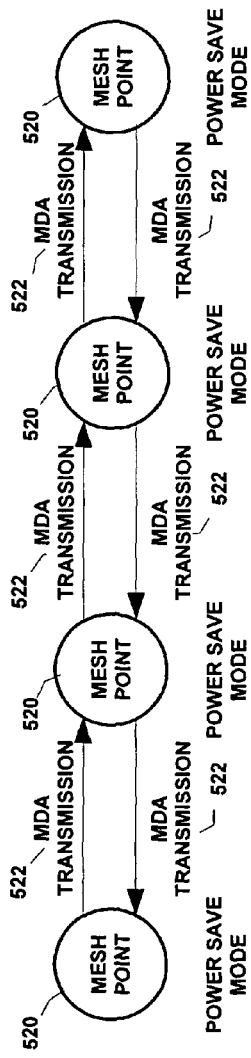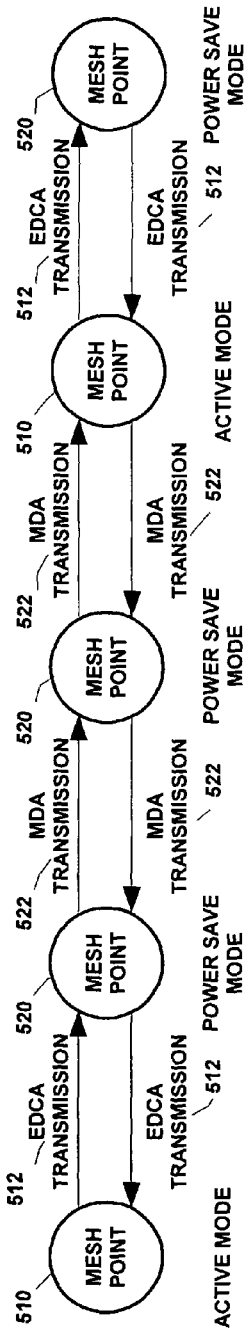

FIG. 6

| ELEMENT ID | LENGTH | NUMBER OF TSPECS | TSPECS | TCLAS PROCEEDING | TCLAS(s) |
|---|---|---|---|---|---|
| 1 | 1 | 1 | 55-n*55 | 1 | 1-L |

OCTETS

EXAMPLE COMBINATION WITH POWER SAVE MODE MESH POINT BETWEEN ACTIVE MODE AND POWER SAVE MODE MESH POINTS

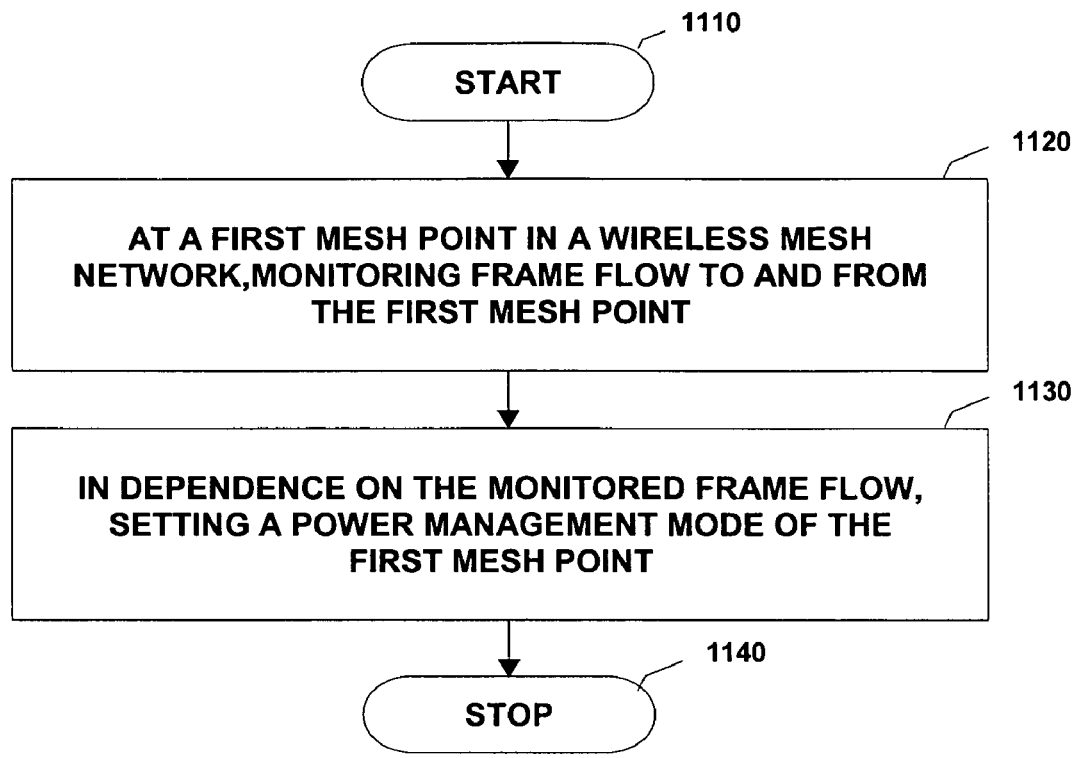

QUALITY OF SERVICE AND POWER AWARE FORWARDING RULES FOR MESH POINTS IN WIRELESS MESH NETWORKS

TECHNICAL FIELD

The exemplary and non-limiting embodiments of this invention relate generally to wireless communication systems, methods, devices and computer program products and, more specifically, relate to signaling and power saving modes in networks such as, for example wireless mesh and ad-hoc networks.

BACKGROUND

The following abbreviations are utilized herein:
ACK acknowledgement (acknowledgement message)
AP access point
ATIM announcement traffic indication message
BSS basic service set
DTIM delivery traffic indication message
EDCA enhanced distributed channel access
GAS generic advertisement service
IBSS independent basic service set
IEEE institute of electrical and electronics engineers
MAC medium access control (layer 2, L2)
MAP mesh access point
MDA mesh deterministic access
MP mesh point
MSDU MAC service data unit
PS power save
STA station
TBTT target beacon transmission time
TIM traffic indication message
WLAN wireless local area network Local and larger metropolitan wireless area networks are becoming of increasing interest, particularly in view of the adoption of Wi-Fi capability in handheld devices. When within range of a wireless network, Wi-Fi capability gives a hand-held device, e.g., a cell phone, the ability to connect to the internet through a local hot spot, instead of through a wireless telephone connection with a cellular carrier. This often results in faster performance, as transactions necessary to service, e.g., browsing activity, are streamlined and simpler in a Wi-Fi connection when compared to a connection through an active telephone connection with a cellular carrier.

These advances raise issues of how best to implement network access and how to coordinate the activities of devices facilitating network access. In one possible implementation, the coordination of devices within radio range is achieved by the exchange of beacon frames. Periodic beacon transmission enables device discovery, supports dynamic network organization, and provides support for mobility.

In proposed wireless local area network (WLAN) deployments without mesh services, stations (STAs) must associate with an access point in order to gain access to the network. These stations are dependent on the access point (AP) with which they are associated to communicate. An example of a nonmesh WLAN deployment model 100 and device classes 120, 130 are depicted in FIG. 1. Stations 130 are connected through access points 120 to external network 110.

Many WLAN devices can benefit from support for more flexible wireless connectivity. Functionally, the distribution system of an access point can be replaced with wireless links or multihop paths between multiple access points. Devices traditionally categorized as clients can benefit from the ability to establish peer-to-peer wireless links with neighboring clients and access points in a mesh network.

An example of a mesh network 200 is depicted in FIG. 2. Mesh points (MPs) 224 are entities that support mesh services, i.e., they participate in the formation and operation of the mesh network. A mesh point 224 may be collocated with one or more other entities (e.g., an access point 232, portal 222, etc.). The configuration of a mesh point 224 that is collocated with an access point 232 is referred to as a mesh access point (MAP) 230. Such a configuration allows a single entity to logically provide both mesh functionalities and access point functionalities simultaneously. Stations 240 associate with access points to gain access to the network 210. Only mesh points participate in mesh functionalities such as path selection and forwarding, etc. Mesh portals (MPPs) 220 comprised of a mesh point 224 and portal 220 interface the network to other LAN segments.

In one exemplary implementation, a "Mesh network model" is envisioned as an IEEE 802 LAN comprised of IEEE 802.11 links and control elements to forward frames among the network members. Effectively, this means that a mesh network appears functionally equivalent to a broadcast ethernet from the perspective of other networks and higher layer protocols. Thus, it normally appears as if all MPs in a mesh are directly connected to the link layer. This functionality is transparent to higher layer protocols. Reference in this regard can be made to FIG. 3A. Here a mesh service data unit (MSDU) is transmitted in network 300 from MSDU source 310 to MSDU destination 320 over a multi-hop network of mesh points 330. It should be noted that while this figure shows the forwarding of data over multiple hops, there may also be direct data transfer over a single hop, such as is shown in ad-hoc 1-hop networking model 350 of FIG. 3B, wherein the source and destination of the MSDUs are within a one-hop neighborhood through mesh points 360, and where no forwarding, routing or link metric need be used.

In an infrastructure basic service set (BSS) stations rely on the access point for power saving. A station informs the access point before switching from active to power save mode. If any station in BSS operates in power save mode the access point buffers multicast and broadcast traffic and delivers the traffic after the delivery traffic indication message (DTIM) period. The DTIM interval is a multiple of beacon periods. For unicast traffic that is buffered in the access point, stations periodically need to wake up to receive the traffic indication map (TIM) that is present in all beacon frames. Having learned from a beacon frame that unicast traffic directed to the station is pending, a station sends out a power save (PS) poll frame to request the traffic's delivery from the AP.

In an independent basic service set (IBSS) mode, also known as ad-hoc, the basic approach is similar to the infrastructure BSS case in that the stations are synchronized, and multicast traffic and the traffic that is to be transmitted to a power-conserving station are first announced during a period when all stations are awake. The announcement is performed via a message sent in an announcement traffic indication message (ATIM) window. A station in the power save mode shall listen for these announcements to determine if it needs to remain in the awake state. The presence of the ATIM window in the IBSS indicates if the station may use the power save mode. To maintain correct information on the power save state of other stations in an IBSS, a station needs to remain awake during the ATIM window. At other times the station may enter the doze state.

For example, in one possible implementation two different power states may be specified. In the awake state the mesh point is able to transmit or receive frames and is fully powered, while in the doze state the mesh point is not able to transmit or receive and consumes very low power. The transitions between these two power states are determined by the mesh point power management modes, i.e., an active mode where the mesh point shall be in the awake state all the time and the power save mode where the mesh point alternates between awake and doze states. There may be further power save modes, for example, a deep sleep mode where the mesh point transmits its delivery traffic indication message (DTIM) beacon and stays active during its own awake window after its DTIM beacon. Another mode may be a light sleep mode. If a peer mesh point operates in this mode the mesh point transmits its traffic indication map (TIM) and DTIM beacons and stays awake during its awake window after its DTIM beacon and after its TIM beacon with the awake window information element. The mesh point listens to all the beacons from all peer mesh points to which it has indicated to operate in light sleep mode.

Further rules for how the communication to and from the mesh point in power save can be triggered are defined. The mesh point which transmitted the beacon may operate in the awake state until it has received a trigger frame from all peer mesh points which have indicated to operate in a power save mode where they are listening to beacons (e.g. light sleep mode), and the beaconing mesh point has indicated availability of buffered traffic for the peer mesh points in its beacon frame. However, the nature of the radio environment and protocol is such that the mesh point cannot be sure that all peer mesh points which have indicated to operate in such a power save mode have received the beacon. Thus, if the peer mesh point does not receive the beacon correctly, the mesh point does not know that it should transmit a trigger frame to the beaconing mesh point. In this case the beaconing mesh point must stay in the awake state until it receives a frame from the peer mesh point which can be interpreted as a trigger frame, or indicates in its own consecutive beacon that it does not have any frames to transmit.

The operation in deep sleep mode may be defined in such a way so that the mesh point in deep sleep is only transmitting its own DTIM beacon and the mesh point is not mandated to listen for any peer mesh point beacons. In practice even the deep sleep mode mesh point may have occasional reasons to transmit some frames to peer mesh point for example for routing purposes or even link maintenance purposes.

With this discussion as background, problems have been encountered in frame exchange over multi-hop networks (e.g., like the previously-described networks). One problem that has been encountered is how to guarantee end-to-end (E2E) quality of service (QoS) if mesh points involved in the transmission are in a power save mode.

Accordingly, those skilled in the art seek methods and apparatus that overcome the foregoing and other limitations of the prior art.

SUMMARY

An aspect of the exemplary embodiments of the invention is a method, comprising: at a first mesh point in a wireless mesh network, monitoring frame flow to and from the first mesh point; and in dependence on the monitored frame flow, setting a power management mode of the first mesh point.

Another aspect of the exemplary embodiments of the invention is an apparatus comprising: radio apparatus configured to perform bidirectional communication operations in a wireless mesh network; and a controller, when the apparatus is operating as a first mesh point, that is configured to monitor frame flow to and from the first mesh point; and in dependence on the monitored frame flow, to set a power management mode of the first mesh point.

A further aspect of the exemplary embodiments of the invention is a computer program product comprising a computer readable memory medium tangibly embodying a computer program which, when executed, is configured to cause a device to operate as a first mesh point in a wireless mesh network; to monitor frame flow to and from the first mesh point; and in dependence on the monitored frame flow, to set a power management mode of the first mesh point.

Yet another aspect of the exemplary embodiments of the invention is an apparatus configured to operate as a first mesh point in a wireless mesh network, the apparatus comprising: means for performing bidirectional communication operations in a wireless mesh network; means for monitoring frame flow to and from the apparatus; and means for setting a power management mode of the apparatus in dependence on the monitored frame flow.

BRIEF DESCRIPTION OF THE DRAWINGS

In the attached Drawing Figures:

FIG. 5A depicts frame transmission over a multi-hop network wherein the mesh points comprising the network operate in the active mode;

FIG. 5B depicts frame transmission over a multi-hop network wherein the mesh points comprising the network use mesh deterministic access for scheduling frame transmission;

FIG. 5C depicts frame transmission over a multi-hop network wherein the mesh points operate in active and power saving modes and at least some of the mesh points use mesh deterministic access for scheduling frame transmission;

FIG. 6 depicts a unicast message frame used in exemplary embodiments of the invention;

FIG. 11 is a flow chart depicting a method operating in accordance with the invention.

DETAILED DESCRIPTION

Exemplary embodiments of the invention disclose mechanisms for mesh points to monitor and measure existing frame flow. Based on monitoring, a mesh point may set its power management mode and operational logic to meet QoS level requirements of an application using the mesh point for frame transmission. Before proceeding with a description of exemplary embodiments of the invention, background information will be provided.

Regarding a first mesh point (MP) and a second mesh point in a mesh network, the second mesh point is considered a "peer MP" of the first mesh point if there is an authenticated communication link between the first mesh point and the second mesh point (i.e., a communication link with one or more messages being directed from/to the first MP to/from the second MP, also referred to as a peer link). A non-peer mesh point is only able to use frames, which do not require authentication, when communicating with the other mesh point. Non-limiting examples of such frames include probe requests, peer link open frames or generic advertisement service (GAS) query frames. As an example, a non-peer may receive a beacon message from a first device and respond with a frame in an attempt to establish a peer relationship with the first device.

For reference purposes, a "beaconing MP" refers to the mesh point that transmits the beacon. Generally, this term will be used in conjunction with a non-peer mesh point that receives the beacon from the beaconing mesh point and desires to establish a peer relationship by responding to the beacon (i.e., transmitting a frame to the beaconing mesh point).

Figure 1:
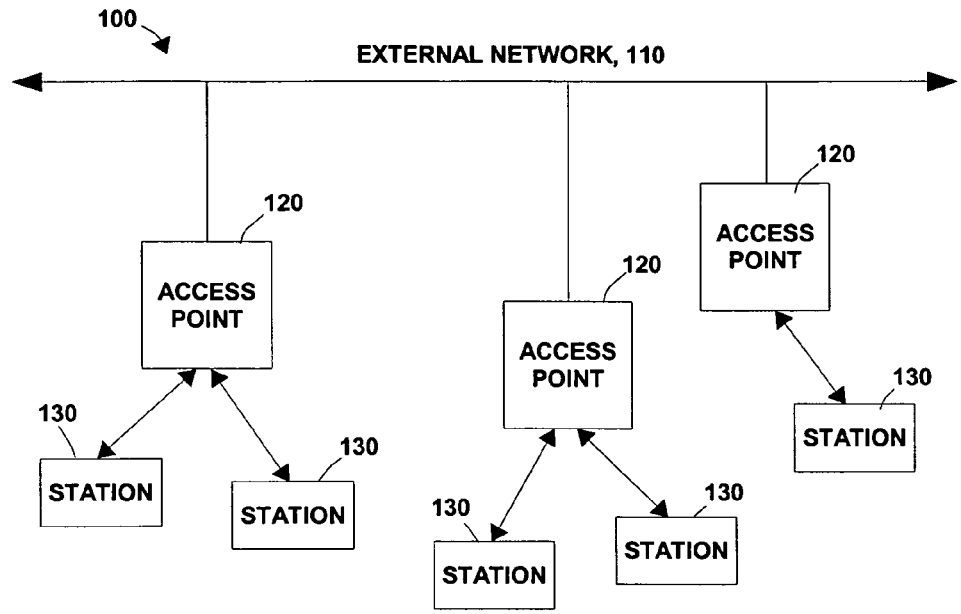
FIG. 1 shows a nonmesh IEEE 802.11 deployment model and device classes.
Figure 2:
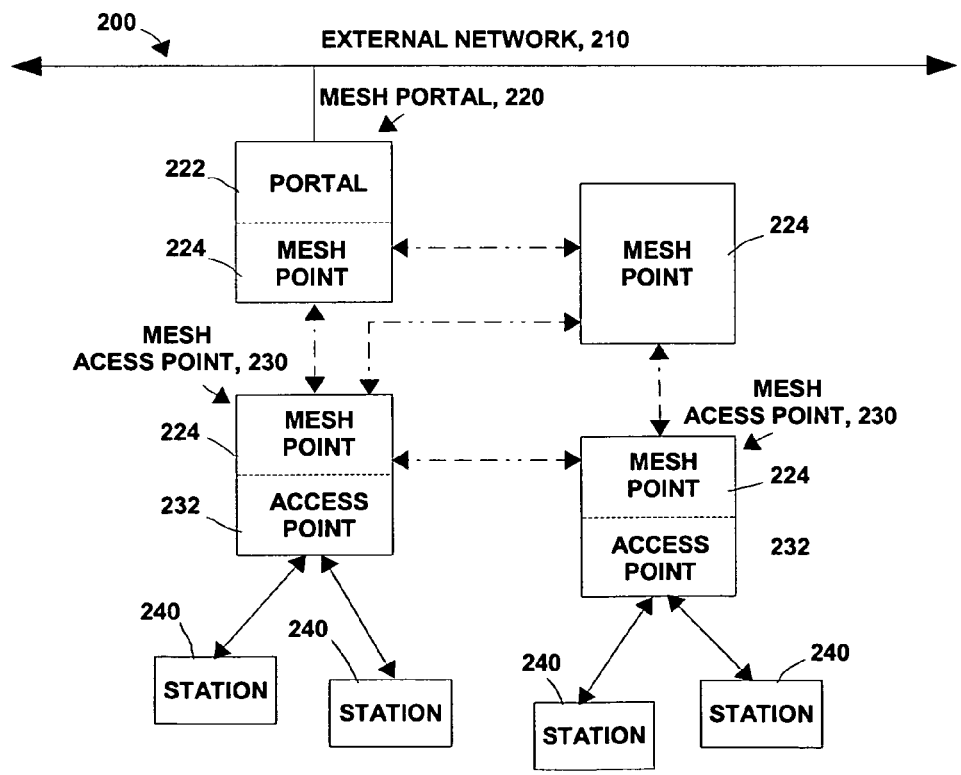
FIG. 2 shows a mesh containing MPs, MAPs, and STAs.
Figure 3A:
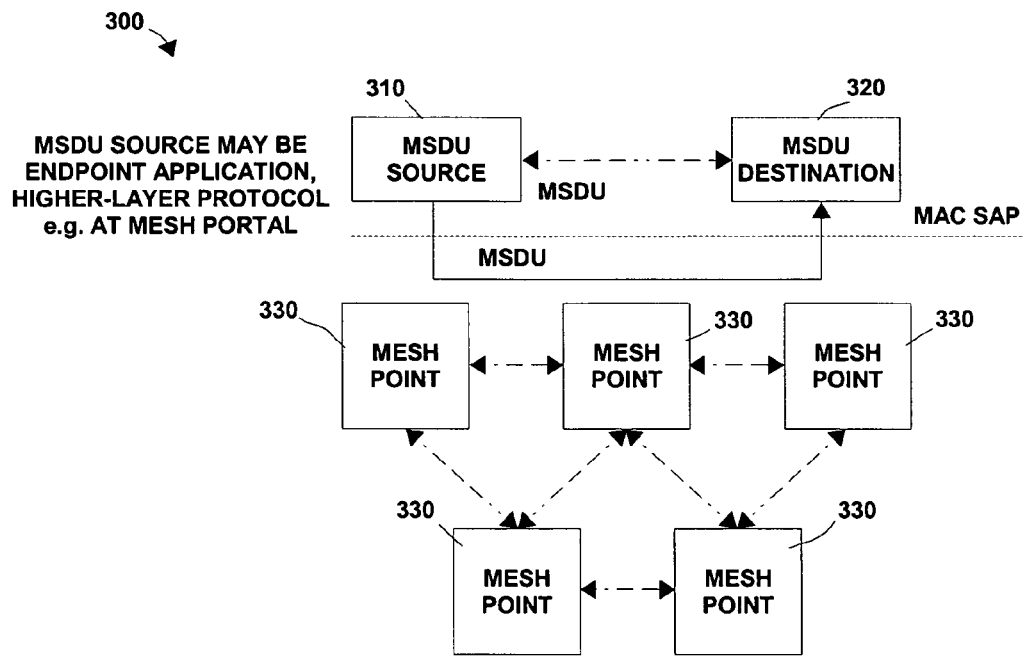
FIG. 3A shows MAC data transport over a mesh.
Figure 3B:
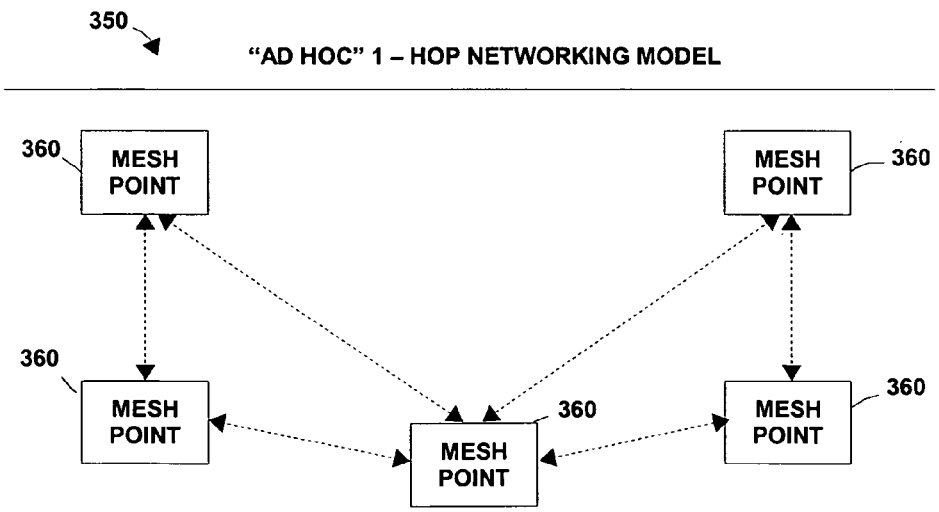
FIG. 3B depicts an exemplary ad-hoc one hop networking model.
Figure 4:
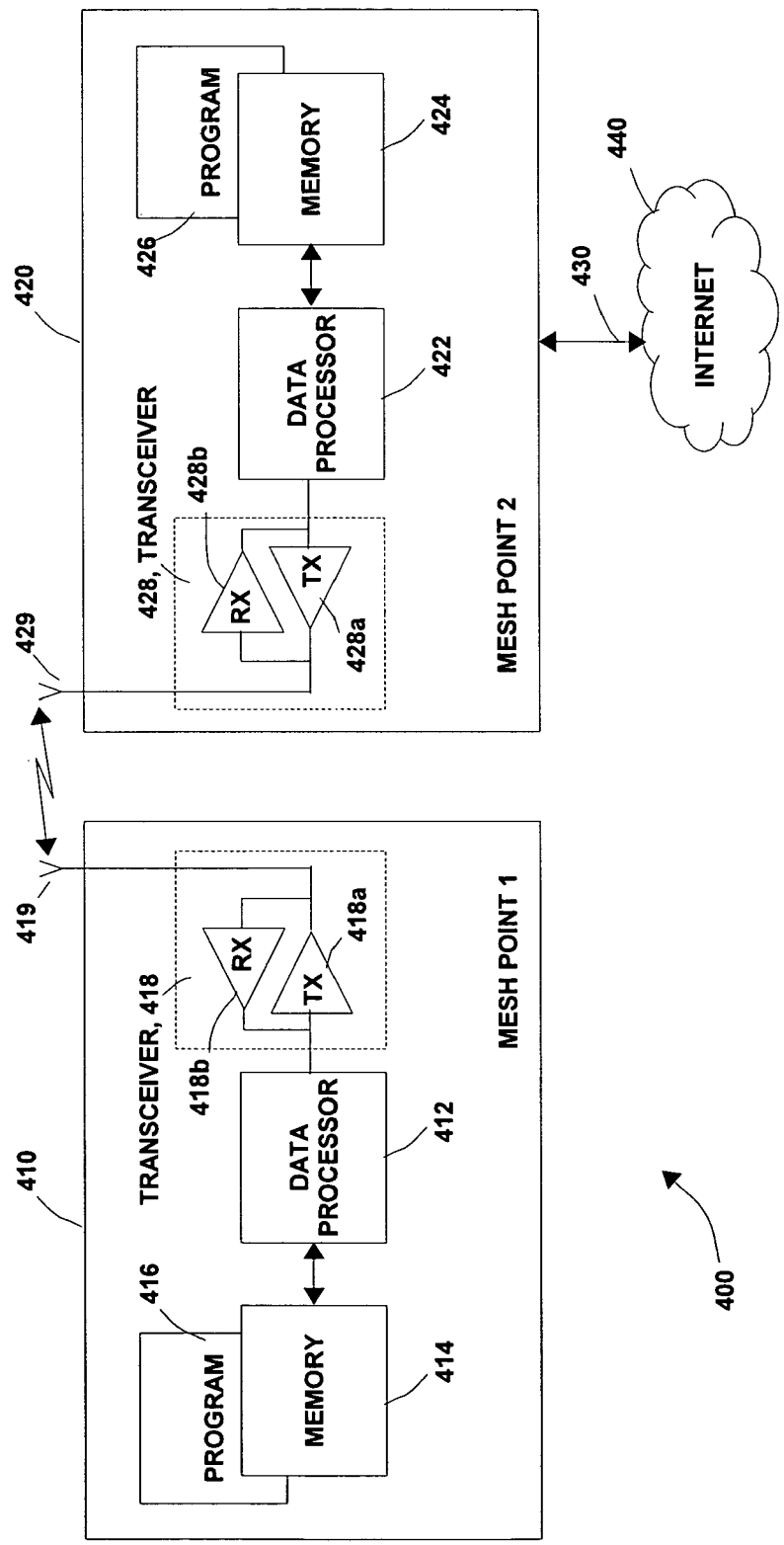
FIG. 4 shows a simplified block diagram of various electronic devices that are suitable for use in practicing the exemplary embodiments of this invention.

Reference is made to FIG. 4 for illustrating a simplified block diagram of various electronic devices that are suitable for use in practicing the exemplary embodiments of this invention. In FIG. 4, a wireless network 400 is adapted for communication with a first mesh point Mesh Point 1 410 via a second mesh point Mesh Point 2 420. Mesh Point 1 410 includes a control unit, such as one comprising a data processor 412, a memory 414 coupled to the data processor 412, and a suitable RF transceiver 418 (having a transmitter (TX) 418a and a receiver (RX) 418b) coupled to the data processor 412. The memory 414 stores a program 416. The transceiver 418 is for bidirectional wireless communications with Mesh Point 2 420. Note that the transceiver 418 has at least one antenna 419 to facilitate communication.

Mesh Point 2 420 includes a data processor 422, a memory 424 coupled to the data processor 422, and a suitable RF transceiver 428 (having a transmitter (TX) 428a and a receiver (RX) 428b) coupled to the data processor 422. The memory 424 stores a program 426. The transceiver 428 is for bidirectional wireless communications with Mesh Point 1 410. Note that the transceiver 428 is connected to at least one antenna 429 to facilitate communication. Mesh Point 2 420 is coupled via a data path 430 to one or more additional mesh points, external networks or systems, such as the internet 440, for example. Furthermore, the Mesh Point 1 410 may also be coupled via a data path (not shown) to one or more additional mesh points, external networks or systems, such as the internet, for example.

At least one of the programs 416, 426 is assumed to include program instructions that, when executed by the associated data processor, enable the electronic device to operate in accordance with the exemplary embodiments of this invention, as discussed herein.

In general, the various exemplary embodiments of the Mesh Point 1 410 can include, but are not limited to, cellular phones, mobile terminals, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The exemplary embodiments of this invention may be implemented by computer software executable by one or more of the data processors 412, 422 of Mesh Point 1 410 and Mesh Point 2 420, or by hardware, or by a combination of software and hardware. As a non-limiting example, one or more of the individual components of Mesh Point 1 410 and/or Mesh Point 2 420 may be implemented utilizing one or more Integrated Circuits (ICs) or Application Specific Integrated Circuits (ASICs).

The memories 414, 424 may be of any type suitable to the local technical environment and may be implemented using any suitable data storage technology, such as semiconductor based memory devices, magnetic memory devices and systems, optical memory devices and systems, fixed memory and removable memory, as non-limiting examples. The data processors 412, 422 may be of any type suitable to the local technical environment, and may include one or more of general purpose computers, special purpose computers, microprocessors, digital signal processors (DSPs) and processors based on a multi-core processor architecture, as non-limiting examples.

With the foregoing as background, the exemplary embodiments of the invention presented here define mechanisms for mesh points to monitor and measure existing frame flow. Based on monitoring, the mesh point may set its power management mode and operation logic to meet an application QoS level requirements. FIGS. 5A-5C present different combinations of power management modes and frame transmission mechanisms that offer good performance for high access category (AC) traffic (e.g. access category 2 (AC2) and access category 3 (AC3) traffic) if applied according to the exemplary rules in this invention.

In the first alternative (FIG. 5A) all mesh points 510 are operating in active mode and thus are able to transmit frames between each other as soon as the frames are available. An aspect of the invention is the application of methods where the mesh point constantly monitors the frame flow and updates measurements in case of power save mode transition (own or peer MPs) from otherwise conventional active mode operation as is depicted in FIG. 5A. As is apparent in FIG. 5A, the active mode mesh points use probabilistic enhanced distributed channel access (EDCA) as shown by transmission flows 512 for frame transmission. EDCA enables a prioritized carrier sense multiple access/collision avoidance (CSMA/CA) mechanism. EDCA differentiates packets from an upper layer into four different AC based on the applications and their QoS characteristics. Different ACs have different EDCA parameters including inter-frame space (IFS), lower and upper bounds on the contention window size, and the continuous transmission opportunity (TXOP) limit.

In the second alternative (FIG. 5B) the MPs 520 may operate in power save mode and use the mesh deterministic access (MDA) streams 522 for data forwarding. Mesh deterministic access is a deterministic data transmission approach that may be implemented in a distributed network like those described herein lacking a centralized controller. The MDA service schedules service periods periodically between the MPs 520. MDA enables all forwarding MPs to operate in power save and it is a preferred mode of operations for power saving MPs. MDA uses EDCA for channel access. There are no changes to contention procedures. MDA has a joint coordination function for MDAOPs (MDA opportunities) and MDA enabled devices do not transmit when another MP has an MDAOP reservation. The joint coordination includes lists of MP's own MDAOPs and TX/RX times, when the MP knows that some other MP is having its own MDAOP times. MDA is an optional capability and may not be supported by all MPs. If the MP does not support MDA, in order to guarantee the QoS, the MP should operate in active mode to forward data for the stream. The invention offers means to the MP to calculate the interval and duration of MDA reservations.

In the third alternative (FIG. 5C) certain mesh points 520 may operate in the power save mode (during the high AC stream forwarding), if and only if the neighbor peer MPs which participate in stream forwarding operate in the active mode (as shown by mesh points 510) or neighbor peer MPs which participate in stream forwarding have setup MDA reservations (as shown by mesh points 520). The MPs 520 which operate in power save mode, and do not utilize MDA service to forward data, periodically trigger peer service periods in order to receive the buffered traffic of the stream. The periodicity for the triggering may be determined by AC-specific variables, or through used MDA periods or via a traffic announcement frame. In an aspect of the invention logic determines when the MPs may operate in power save mode. In a further aspect logic determines the AC specific peer service period triggering intervals used by forwarding MPs. This forwarding principle is illustrated in FIG. 5C. If the rules are not fulfilled, i.e. the neighboring peer MP that forwards the high AC stream uses EDCA 512 and operates in power save mode, the mesh point might operate in active mode.

In a further aspect of the exemplary embodiments of the invention, a mesh point which receives high access category traffic may transmit a unicast traffic announcement frame when it starts to exchange data for high access category, real time applications. The traffic announcements are forwarded in the same path as the application data frames. The traffic announcement contains traffic specification (TSPEC) and traffic classification (TCLAS) information elements. TCLAS elements specify the traffic address/classifying criteria. TSPEC specifies the traffic generation interval and frame sizes. This information is used by the forwarding mesh points to determine appropriate triggering intervals or to setup MDA correctly for the forwarded traffic.

If the data-receiving mesh point notices that frame forwarding has decreased or otherwise detects that the traffic path through the mesh has changed, the mesh point may transmit again the traffic announcement frame. If no traffic announcement is transmitted, the forwarding mesh point may measure or estimate the frame generation interval and trigger peer service periods accordingly.

FIG. 6 depicts an exemplary traffic announcement frame 600 that may be used in embodiments of the invention including the TSPEC and TCLAS information.

Traffic classification (TCLAS) specifies certain parameter values to identify the MSDUs belonging to a particular traffic stream (TS). The classification process, performed above the MAC_SAP at a QoS access point (QAP), uses the parameter for a given TS to examine each incoming MSDU and determine whether this MSDU belongs to that TS. Traffic classification may also occur at non-AP QoS enabled wireless stations (QSTA) or mesh points with multiple streams.

Traffic specification (TSPEC) defines the QoS characteristics of a data flow to and from a non-AP QoS enabled wireless stations or mesh points.

There may be cases where the use of only one TSPEC to describe the application characteristics is not enough, for instance a video may have differing TSPEC for audio and pictures. The amount of TSPEC describes the amount of TSPECs which describe different application types.

The TCLAS Proceeding describes the order of the TCLAS elements processing. The TCLAS element may contain an Ethernet or L3 IP address which defines the address of the frames which are mapped to some traffic stream. If the address information is specified by multiple TCLAS elements, the TCLAS proceeding defines rules for ordering of the TCLAS processing.

The following section describes the measurement and monitoring mechanisms that are used in exemplary embodiments of the invention to determine the existence of the high AC stream and the applied power management mode for the traffic.

The mesh point shall monitor its peer mesh points regardless of its own power save mode and take measurements about the frame exchange to and from peer mesh points. The monitoring and measurements enable the mesh point to monitor
1) peer MP power management modes,
2) existence of the high AC service for the high AC stream forwarding, and
3) characteristics of high AC streams.

If an MP is operating in power save mode it will monitor and measure at times when it is in an active mode.

In one possible implementation, the MP measures and monitors the traffic per peer link and for each traffic indicator message (TIM) beacon interval. The measurements are grouped per the measurement group and the criteria of each measurement are specified:

Measurements to determine the type of the forwarded services:
 1. The highest AC of the:
  a. Received frame from the peer MP
  b. Transmitted frame to the peer MP
 2. Time from the previous received high AC frame:
  a. Is received from the peer MP
  b. Is transmitted to the peer MP
 Monitor for possibility to operate in power save or use MDA:
 3. The power management mode:
  a. Indicated by the peer MP
  b. indicated to the peer MP
 4. Frames exchanged in an established MDA:
  a. MDA support status of the peer MP
  b. Received frames
  c. Transmitted frames The measurements of the ongoing service are used to determine if high access category stream forwarding or other possible QoS-aware forwarding is on-going. The existence of the service is monitored per access category and specifically used to determine the existence or measure the frequency of high access category traffic (e.g. access category 3 (AC 3) or access category 2 (AC 2)). Periodic repetition of frame transmission indicates that there is a QoS dependent service, i.e. call or video stream, ongoing. Monitor uses a service active timer which sets a timeout limit for consecutive high AC frame arrival times. If frames from the same high AC are received within the time interval, the call or service is assumed to be on-going. After the service has ended the MP may return to power save mode.

The monitoring is beneficial especially for high access category frames and this is visible from default values. A default value of a service active timer for high access category traffic (e.g. AC3 and AC2) could be, for example, 180 msecs. This example period is a multiple of adaptive multi-rate (AMR) specific silent compression time packet generation interval (for example 80 msec) currently used in VoIP applications. Thus erased or delayed silent compression frames do not stop operation in active mode. A default value of an active mode timer for low access category traffic (e.g. access category 1 (AC 1) and access category 0 (AC0)) is 0. If a service active timer is set to 0 it indicates that the time is not used for the access category.

The timer is set, when a data frame from the AC is received. The MP operates in active mode (i.e., in awake state), at least for the link where the frames are received, during the time specified for the timer after reception of the frame using peer service period rules. The timer is reset whenever a new (high) AC frame from the peer MP is received. After the time has expired the MP may operate in power save mode (i.e. move to the doze state).

The monitoring is used to identify the possibility of operating in a power-save mode or using MDA by keeping track of peer MPs power management modes and support for MDA. As stated the information may be used for making a decision whether the local MP may operate in power save mode or use MDA for traffic forwarding the MPs.

The measurement for forwarding is used to determine the peer MPs which participate in high access category traffic stream forwarding. The identity of the MPs which participate in frame forwarding is needed to determine which MPs should be triggered for MDA.

In an exemplary embodiment of the invention, the forwarding mechanism is selected based on following logic: if the MP and peer MP which is the target of the forwarded frames are both in active mode, the MPs may exchange frames at any time or establish and use MDA for the high AC stream. If either MP is acting in power save mode but both MPs can use MDA, the MPs should establish and use MDA for the high AC stream.

However, if the MP is operating in power save mode and it or peer MPs which are a source or target of frame forwarding does not support MDA, the other MP needs to operate in active mode and the other MP may operate in power save mode and periodically trigger peer service periods to ensure frame forwarding in a timely manner. An aspect of the exemplary embodiments of the invention is using both active mode MP and power save mode MP in frame forwarding.

Figure 7:
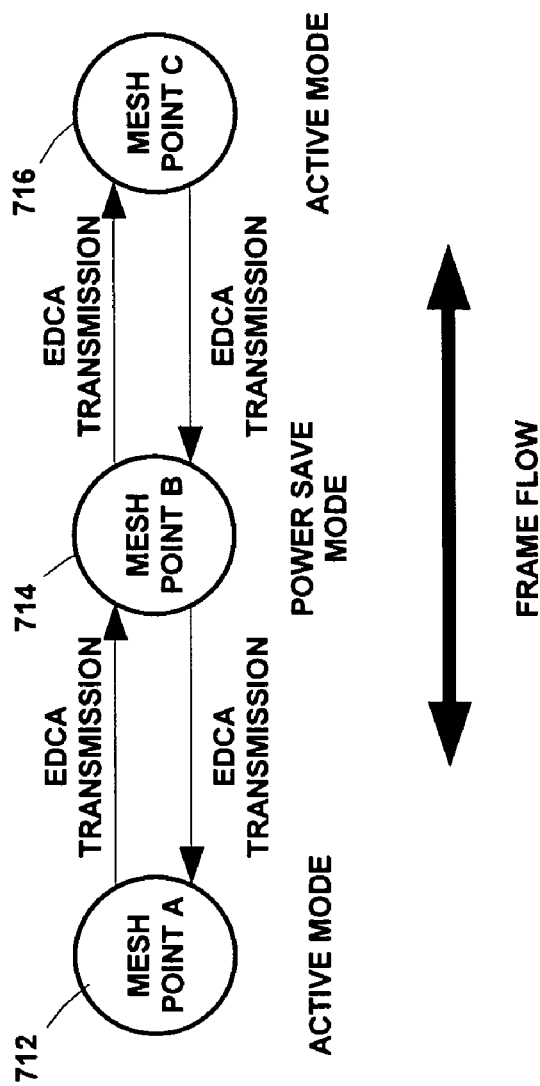
FIG. 7 depicts an exemplary embodiment with a mesh point in a power save mode between two active mode mesh points.

In an exemplary embodiment of the invention, frame forwarding in the mesh point operates based on the following rules. If the power saving MP 714 is in the middle of two active MPs 712, 716, as in FIG. 7, the MP 714 will trigger peer service periods with both active mode MPs 712, 716. The power saving MP 714 should trigger service periods with transmitting and receiving MP in the same TXOP. The simultaneous service period triggering enables a sleep buffer to transmission buffer handling delays in the active mode MPs to occur at the same time. The power saving MP 714 should start the triggering from the MP that has transmitted the most traffic, i.e., does not have silent compression on, or transmits the data in a unidirectional stream. The triggering order makes sure that the greatest data transmitter will more likely have a successful service period initiation and a little bit more time to prepare its data transmissions.

Figure 10:
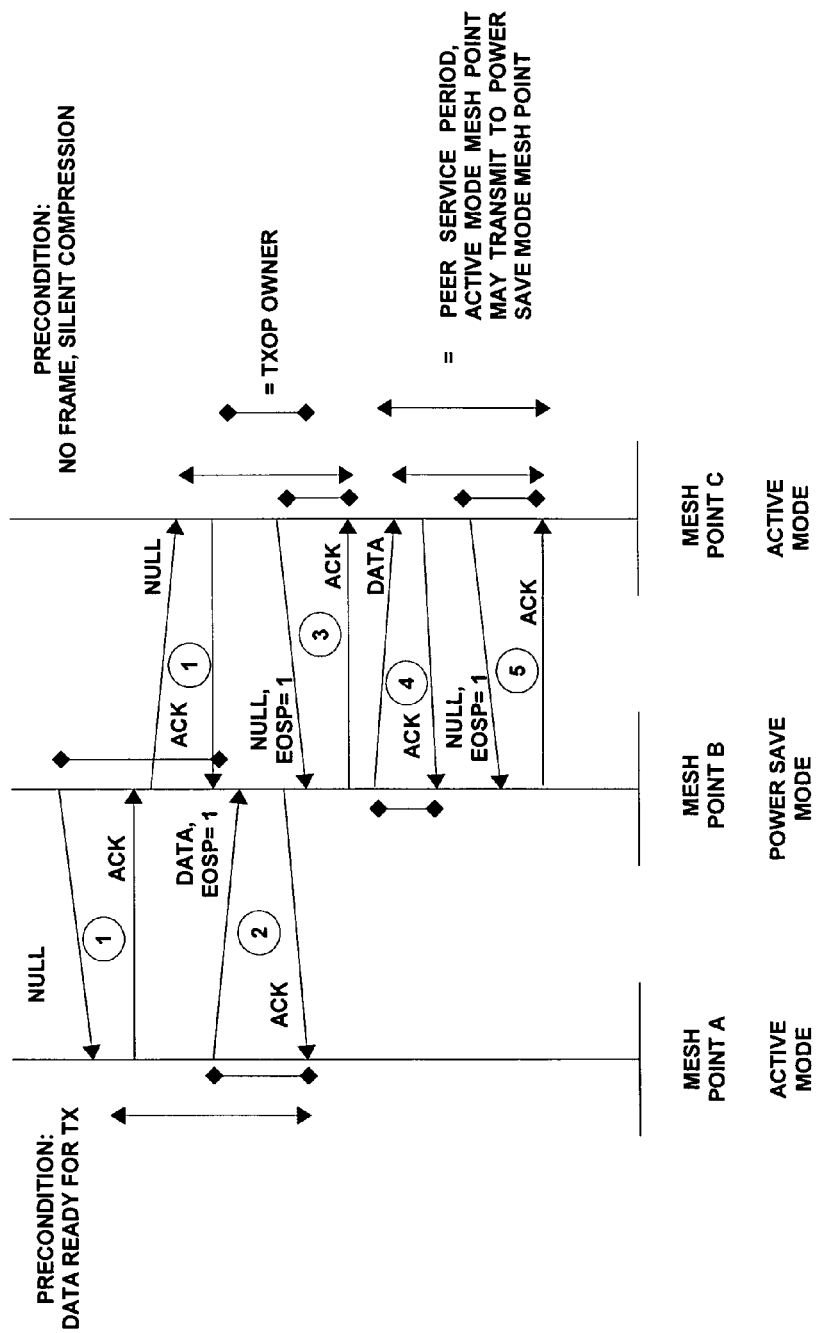
FIG. 10 depicts peer service period triggering in accordance with exemplary embodiments of the invention.

The peer service period for triggering for forwarded high AC stream is shown in FIG. 10. At 1 MP B triggers peer service periods with MP A and MP C. MP A is triggered first, because MP A has a higher likelihood to have buffered data. The transmission of all trigger frames occur at the same time or within the same TXOP and the order starts from the MP that had the most traffic transmitted in the previous service periods. At 2, MP A transmits its data frame and terminates the peer service period. At 3, MP C transmits a null frame, because it does not have data to transmit. At 4, MP B forwards the data to MP C. At 5, MP C terminates the peer service period with a null frame.

Figure 8:
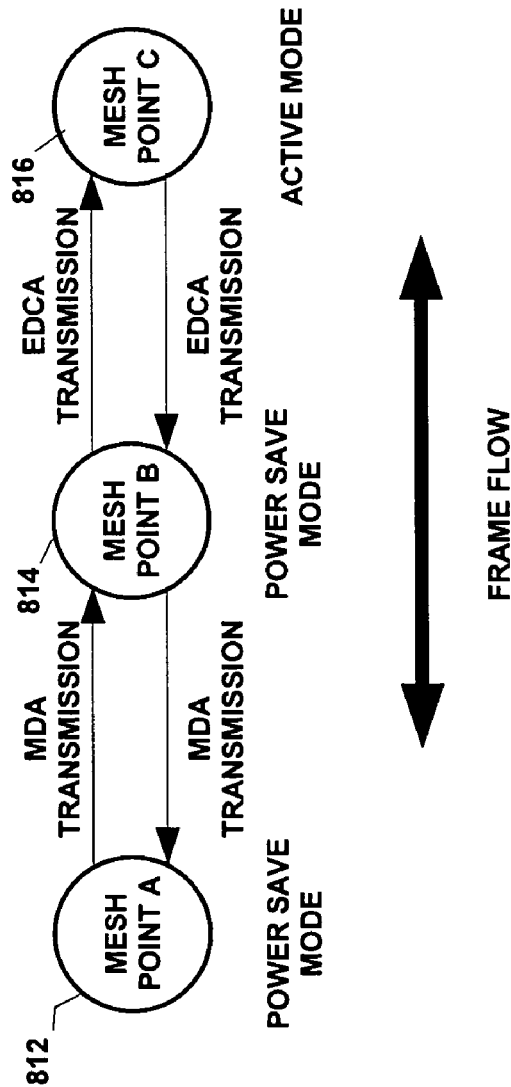
FIG. 8 depicts an exemplary embodiment with a mesh point in power save mode between one mesh point also in power save mode and another mesh point in active mode.

In another example the power saving MP (MP B 814) may operate as a forwarder between two MPs, one of which uses MDA (MP A 812) and the other which operates in active mode (MP C 816) as shown in FIG. 8. The power saving MP (MP B 814) should first trigger a peer service period with the active mode MP (MP C 816) to receive buffered traffic from the MP A. Then the MP B performs MDA data exchange with MP A 812. The data exchange with MP C 816 enables that all forwarded traffic (from C-B to A) is available and may be transmitted in the MDA data exchange. If the MDA period transmitted traffic (from B-A to C) the MP A 812 shall put these frames into transmission immediately.

Figure 9:
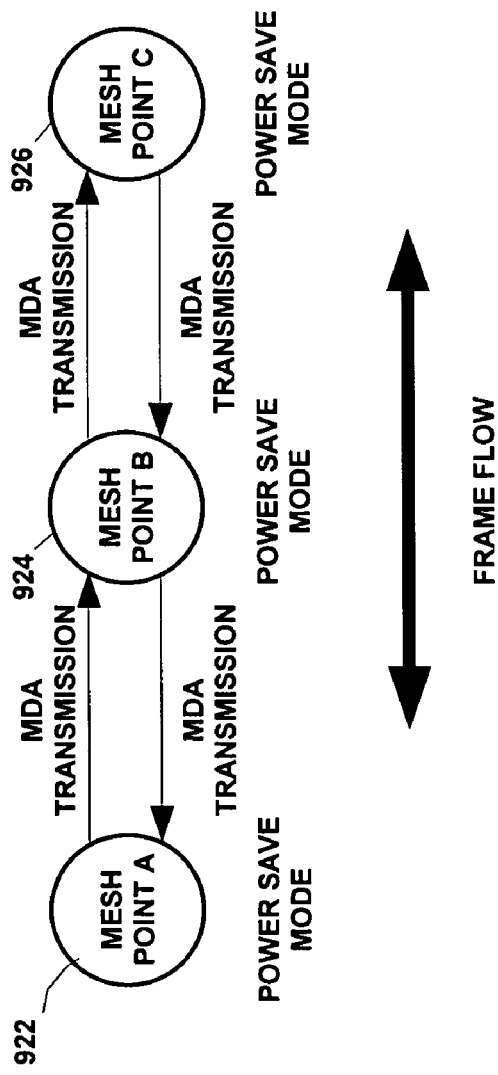
FIG. 9 depicts an exemplary embodiment with a mesh point in power save mode between two mesh points that are also in power save mode.

In a further example, if a power saving MP 924 has created two MDA services with other MPs 922, 926 that forward the data for the call it operates according to the time periods specified for the MDA. The MDA forwarding operation is shown in FIG. 9.

If the power saving MP is forwarding high AC frames from multiple active MPs to one MP or from one MP to multiple MPs or from many MPs to many MPs the power saving MP should trigger peer service periods between all of the MPs at the same time. If some high AC frames are forwarded between MPs that are not present in other calls the MP may trigger service periods for the stream at a different time.

The AC-specific triggering intervals may be configured so that lower AC triggering intervals are integer values of the highest AC triggering interval. This maximizes the duration of the sleep between service periods. But other values may be used in exemplary embodiments of the invention.

In summary, FIG. 11 depicts a method operating in accordance with the invention. The method starts at 1110. Next, at 1120 a first mesh point in a wireless mesh network monitors frame flow to and from the first mesh point. Then, at 1130, in dependence on the monitored frame flow, the first mesh point sets a power management mode. The method stops at 1140.

In one variant of the method depicted in FIG. 11, setting a power management mode of the first mesh point further comprises setting a power management mode of the first mesh point to meet a predetermined quality of service for an application using the wireless mesh network to communicate information.

In another variant of the method depicted in FIG. 11, monitoring frame flow to and from the first mesh point may further comprise monitoring the frame flow on a per peer mesh point basis.

In variants of the method of FIG. 11 where frame flow is monitored on a per peer basis, monitoring frame flow to and from the first mesh point may further comprise performing measurements to determine a highest access category of a frame received from a peer mesh point.

In other variants of the method of FIG. 11 where frame flow is monitored on a per peer basis, monitoring frame flow to and from the first mesh point may further comprise performing measurements to determine a highest access category of a frame transmitted to a peer mesh point.

In further variants of the method of FIG. 11 where frame flow is monitored on a per peer basis, monitoring frame flow to and from the first mesh point may further comprise performing measurements to determine a duration of a time period since a high access category frame was last received from a peer mesh point.

In still other variants of the method of FIG. 11 where frame flow is monitored on a per peer basis, monitoring frame flow to and from the first mesh point may further comprise performing measurements to determine a duration of a time period since a high access category frame was last transmitted to a peer mesh point.

In a further variant of the method of FIG. 11 the method may further comprise monitoring a power management mode indicated by a peer mesh point.

In a variant of the method of FIG. 11 where a power management mode indicated by a peer mesh point is monitored, if it is determined that a peer mesh point to be used in frame forwarding is in power save mode and supports mesh deterministic access, the method may further comprise using mesh deterministic access to forward frames to the peer mesh point. The frames may comprise high access category frames.

In yet another variant of the method of FIG. 11, the method may further comprise monitoring a power management mode indicated to a peer mesh point.

In a still further variant of the method of FIG. 11, the method may further comprise monitoring a mesh deterministic access support status of a peer mesh point.

In a variant of the method of FIG. 11 where the mesh deterministic access support of a peer mesh point is monitored, the method may further comprise determining whether to use mesh deterministic access for information transmission in dependence on the monitored mesh deterministic access support status of a peer mesh point.

In a variant of the method of FIG. 11, monitoring frame flow to and from the first mesh point may further comprise determining whether received frames are part of a mesh deterministic access transmission.

In another variant of the method of FIG. 11, monitoring frame flow to and from the first mesh point may further comprise determining whether transmitted frames are part of a mesh deterministic access transmission.

In a further variant of the method of FIG. 11 frame flow is monitored on a per peer mesh point basis to determine which peer mesh points will be selected to participate in high access category frame forwarding.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the inventions may be practiced in various components such as integrated circuit chips and modules. The design of integrated circuits is by and large a highly automated process. Complex and powerful software tools are available for converting a logic level design into a semiconductor circuit design ready to be fabricated on a semiconductor substrate. Such software tools can automatically route conductors and locate components on a semiconductor substrate using well established rules of design, as well as libraries of pre-stored design modules. Once the design for a semiconductor circuit has been completed, the resultant design, in a standardized electronic format (e.g., Opus, GDSII, or the like) may be transmitted to a semiconductor fabrication facility for fabrication as one or more integrated circuit devices.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method, comprising:
    at a first mesh point in a wireless mesh network, monitoring a first frame flow between the first mesh point and at least a second mesh point, and monitoring a second frame flow between the first mesh point and at least a third mesh point; and
    in dependence on the monitored first frame flow and the monitored second frame flow, setting a power management mode of the first mesh point,
    wherein the second mesh point and the third mesh point are neighbor peer mesh points to the first mesh point and the first mesh point participates in a communication with the second and third mesh points, the communication comprising the first and second frame flows, and
    wherein the setting further comprises determining a first access category corresponding to the first frame flow, determining a second access category corresponding to the second frame flow, and setting the power management mode based on the determined first and second access categories.

2. The method of claim 1 wherein setting a power management mode of the first mesh point further comprises setting a power management mode of the first mesh point to meet a predetermined quality of service for an application using the wireless mesh network to communicate information.

3. The method of claim 1 wherein monitoring the first frame flow and the second frame flow further comprises monitoring the first frame flow and the second frame flow on a per peer mesh point basis.

4. The method of claim 3 wherein monitoring the first frame flow and the second frame flow further comprises performing measurements to determine a duration of a time period since a high access category frame was last received from a peer mesh point.

5. The method of claim 3 wherein monitoring the first frame flow and the second frame further comprises performing measurements to determine a duration of a time period since a high access category frame was last transmitted to a peer mesh point.

6. The method of claim 1 wherein the method further comprises monitoring a power management mode indicated by a peer mesh point.

7. The method of claim 6 wherein if it is determined that a peer mesh point to be used in frame forwarding is in power save mode and supports mesh deterministic access, using mesh deterministic access to forward frames to the peer mesh point.

8. The method of claim 7 wherein the frames comprises high access category frames.

9. The method of claim 1 wherein the method further comprises monitoring a mesh deterministic access support status of a peer mesh point.

10. The method of claim 9 further comprising: determining whether to use mesh deterministic access for information transmission in dependence on the monitored mesh deterministic access support status of a peer mesh point.

11. The method of claim 1 wherein monitoring the first frame flow and the second frame further comprises determining whether received frames are part of a mesh deterministic access transmission.

12. The method of claim 1 wherein monitoring the first frame flow and the second frame flow further comprises determining whether transmitted frames are part of a mesh deterministic access transmission.

13. The method of claim 3 wherein the first frame flow and the second frame flow are monitored on a per peer mesh point basis to determine which peer mesh points will be selected to participate in high access category frame forwarding.

14. The method of claim 1 further comprising:
detecting receipt of high access category traffic; and
when high access category traffic is detected, transmitting a message indicating that high access category traffic is being transmitted.

15. The method of claim 14 wherein the high access category traffic is associated with a real time application.

16. The method of claim 14 wherein the message comprises a unicast traffic announcement frame.

17. The method of claim 16 wherein the unicast traffic announcement frame comprises at least information specifying traffic address and classifying criteria.

18. The method of claim 16 wherein the unicast traffic announcement frame comprises at least information specifying traffic generation interval and frame sizes.

19. The method of claim 14 further comprising using the message indicating that high access category traffic is being transmitted to set triggering intervals in peer mesh points.

20. The method of claim 14 further comprising using the message indicating that high access category traffic is being transmitted to setup mesh deterministic access information transmissions.

21. An apparatus comprising:
radio apparatus configured to perform bidirectional communication operations in a wireless mesh network; and
a controller, when the apparatus is operating as a first mesh point, that is configured to monitor, using the radio apparatus, a first frame flow between the first mesh point and at least a second mesh point, and to monitor, using the radio apparatus, a second frame flow between the first mesh point and at least a third mesh point; and in dependence on the monitored first frame flow and the monitored second frame flow, to set a power management mode of the first mesh point, wherein to set the power management node further comprises to determine a first access category corresponding to the first frame flow, to determine a second access category corresponding to the second frame flow, and to set the power management mode based on the determined first and second access categories,
wherein the second mesh point and the third mesh point are neighbor peer mesh points to the first mesh point and controller is further configured, when the apparatus is operating as the first mesh point, to participate in a communication with the second and third mesh points, the communication comprising the first and second frame flows.

22. The apparatus of claim 21 wherein to set a power management mode of the first mesh point further comprises to set a power management mode of the first mesh point to meet a predetermined quality of service for an application using the wireless mesh network to communicate information.

23. The apparatus of claim 21 wherein to monitor the first frame flow and the second frame flow further comprises to monitor the first frame flow and the second frame flow on a per peer mesh point basis.

24. The apparatus of claim 23 wherein to monitor the first frame flow and the second frame flow further comprises to perform measurements to determine a highest access category of a frame received from a peer mesh point.

25. The apparatus of claim 23 wherein to monitor the first frame flow and the second frame flow further comprises to perform measurements to determine a highest access category of a frame transmitted to a peer mesh point.

26. The apparatus of claim 23 wherein to monitor the first frame flow and the second frame flow further comprises to perform measurements to determine a duration of a time period since a high access category frame was last received from a peer mesh point.

27. The apparatus of claim 23 wherein to monitor the first frame flow and the second frame flow further comprises to perform measurements to determine a duration of a time period since a high access category frame was last transmitted to a peer mesh point.

28. The apparatus of claim 21 wherein the controller is further configured to monitor a power management mode indicated by a peer mesh point.

29. The apparatus of claim 28 wherein if it is determined that a peer mesh point to be used in frame forwarding is in power save mode and supports mesh deterministic access, the controller is further configured to use mesh deterministic access to forward frames to the peer mesh point.

30. The apparatus of claim 29 wherein the frames comprise high access category frames.

31. The apparatus of claim 21 wherein the controller is further configured to monitor a mesh deterministic access support status of a peer mesh point.

32. The apparatus of claim 31 wherein the controller is further configured to determine whether to use mesh deterministic access for information transmission in dependence on the monitored mesh deterministic access support status of a peer mesh point.

33. The apparatus of claim 21 wherein to monitor the first frame flow and the second frame flow further comprises to determine whether received frames are part of a mesh deterministic access transmission.

34. The apparatus of claim 21 wherein to monitor the first frame flow and the second frame flow further comprises to determine whether transmitted frames are part of a mesh deterministic access transmission.

35. The apparatus of claim 23 wherein the first frame flow and the second frame flow are monitored on a per peer mesh point basis to determine which peer mesh points will be selected to participate in high access category frame forwarding.

36. The apparatus of claim 23 wherein the controller is further configured
to detect receipt of high access category traffic; and
when high access category traffic is detected, to transmit a message indicating that high access category traffic is being transmitted.

37. The apparatus of claim 36 wherein the high access category traffic is associated with a real time application.

38. The apparatus of claim 36 wherein the message comprises a unicast traffic announcement frame.

39. The apparatus of claim 36 wherein the controller is further configured to use a message indicating that high access category traffic is being transmitted to set triggering intervals in peer mesh points.

40. The apparatus of claim 36 wherein the controller is further configured to use the message indicating that high access category traffic is being transmitted to setup mesh deterministic access information transmissions.

41. A computer program product comprising a computer readable memory medium tangibly embodying a computer program, the computer program, when executed, configured to cause an apparatus to operate as a first mesh point in a wireless mesh network to monitor a first frame flow between the first mesh point and at least a second mesh point, and to monitor a second frame flow between the first mesh point and at least a third mesh point; and in dependence on the monitored first frame flow and the monitored second frame flow, to set a power management mode of the first mesh point, wherein the second mesh point and the third mesh point are neighbor peer mesh points to the first mesh point and the computer program, when executed, is further configured to cause the apparatus to participate in a communication with the second and third mesh points, the communication comprising the first and second frame flows, wherein to set the power management mode further comprises to determine a first access category corresponding to the first frame flow, to determine a second access category corresponding to the second frame flow, and to set the power management mode based on the determined first and second access categories.

42. The method of claim 1, wherein:
setting a power management mode of the first mesh point further comprises transitioning to a power save mode only in response to both the second mesh point and the third mesh point being active.

43. The method of claim 1, wherein the second mesh point and third mesh point are not directly connected.

44. The apparatus of claim 21, wherein:
the controller is further configured, when setting a power management mode of the first mesh point, to transition to a power save mode only in response to both the second mesh point and the third mesh point being active.

45. The apparatus of claim 21, wherein the second mesh point and third mesh point are not directly connected.

46. An apparatus, comprising:
at least one processor; and
at least one memory including computer program code,
the at least one memory and the computer program code configured to, with the at least one processor, cause the apparatus to perform at least the following:
at a first mesh point in a wireless mesh network, monitoring a first frame flow between the first mesh point and at least a second mesh point, and monitoring a second frame flow between the first mesh point and at least a third mesh point; and
in dependence on the monitored first frame flow and the monitored second frame flow, setting a power management mode of the first mesh point,
wherein the second mesh point and the third mesh point are neighbor peer mesh points to the first mesh point and the at least one memory and the computer program code are further configured, with the at least one processor, to cause the apparatus to perform participating in a communication with the second and third mesh points, the communication comprising the first and second frame flows, and
wherein the setting further comprises determining a first access category corresponding to the first frame flow, determining a second access category corresponding to the second frame flow, and setting the power management mode based on the determined first and second access categories.

* * * * *

UNITED STATES PATENT AND TRADEMARK OFFICE
CERTIFICATE OF CORRECTION

| | | |
|---|---|---|
| PATENT NO. | : 8,274,894 B2 | Page 1 of 1 |
| APPLICATION NO. | : 12/151627 | |
| DATED | : September 25, 2012 | |
| INVENTOR(S) | : Kneckt et al. | |

It is certified that error appears in the above-identified patent and that said Letters Patent is hereby corrected as shown below:

Claim 21, col. 13, line 49 delete "node" and insert --mode--.

Signed and Sealed this
Twenty-ninth Day of January, 2013

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 8,274,894 B2 | Page 1 of 1 |
| APPLICATION NO. | : 12/151627 | |
| DATED | : September 25, 2012 | |
| INVENTOR(S) | : Kneckt et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 575 days.

Signed and Sealed this
Twenty-sixth Day of August, 2014

Michelle K. Lee
*Deputy Director of the United States Patent and Trademark Office*